United States Patent [19]

Sekiguchi

[11] Patent Number: 5,729,011

[45] Date of Patent: Mar. 17, 1998

[54] SPECTROSCOPIC APPARATUS AND SPECTROSCOPIC IMAGE RECORDING APPARATUS

[75] Inventor: Nobutoshi Sekiguchi, Hidaka, Japan

[73] Assignee: Olympus Optical Co., Ltd., Tokyo, Japan

[21] Appl. No.: 591,090

[22] Filed: Jan. 25, 1996

[30] Foreign Application Priority Data

Feb. 24, 1995 [JP] Japan ................... 7-060101

[51] Int. Cl.$^6$ .................................. G01J 3/51
[52] U.S. Cl. .............. 250/226; 250/208.1; 356/419
[58] Field of Search ................. 250/226, 208.1; 356/419, 416; 359/618, 640

[56] References Cited

U.S. PATENT DOCUMENTS

| | | | |
|---|---|---|---|
| 3,985,419 | 10/1976 | Matsumoto et al. | 350/3.5 |
| 4,599,001 | 7/1986 | Richard | 356/419 |
| 4,996,427 | 2/1991 | Noble et al. | 250/332 |
| 5,024,530 | 6/1991 | Mende | 356/402 |
| 5,149,959 | 9/1992 | Collins et al. | 250/226 |
| 5,276,321 | 1/1994 | Chang et al. | 250/226 |
| 5,300,778 | 4/1994 | Norkus et al. | 250/339.01 |
| 5,371,358 | 12/1994 | Chang et al. | 250/226 |
| 5,519,205 | 5/1996 | Rostoker | 250/208.1 |

FOREIGN PATENT DOCUMENTS

| | | |
|---|---|---|
| 61-3574 | 1/1986 | Japan . |
| 5-248955 | 9/1993 | Japan . |

OTHER PUBLICATIONS

S. K. Babey e al; "Radiometric Calibration of the Compact Airborne Spectrographic Imager (CASI)"; Oct. 1992; pp. 233–242; Canadian Journal of Remote Sensing, vol. 18, No. 4.

*Primary Examiner*—Edward P. Westin
*Assistant Examiner*—Kevin Pyo
*Attorney, Agent, or Firm*—Frishauf, Holtz, Goodman, Langer & Chick

[57] ABSTRACT

A spectroscopic apparatus capable of simultaneously producing spectroscopic images corresponding to a plurality of wavelengths and a spectroscopic image recording apparatus capable of recording the produced spectroscopic images, wherein an image producing unit produces a plurality of same images from a single input image by dividing a pupil of an optical system, a first spectroscopic unit produces a plurality of first spectroscopic images corresponding to the plurality of same images by extracting a predetermined wavelength component corresponding to each of the plurality of same images, and a second spectroscopic unit produces a plurality of second spectroscopic images corresponding to respective ones of the first spectroscopic images by extracting a predetermined wavelength component corresponding to each of the first spectroscopic images corresponding to the plurality of same images.

22 Claims, 5 Drawing Sheets

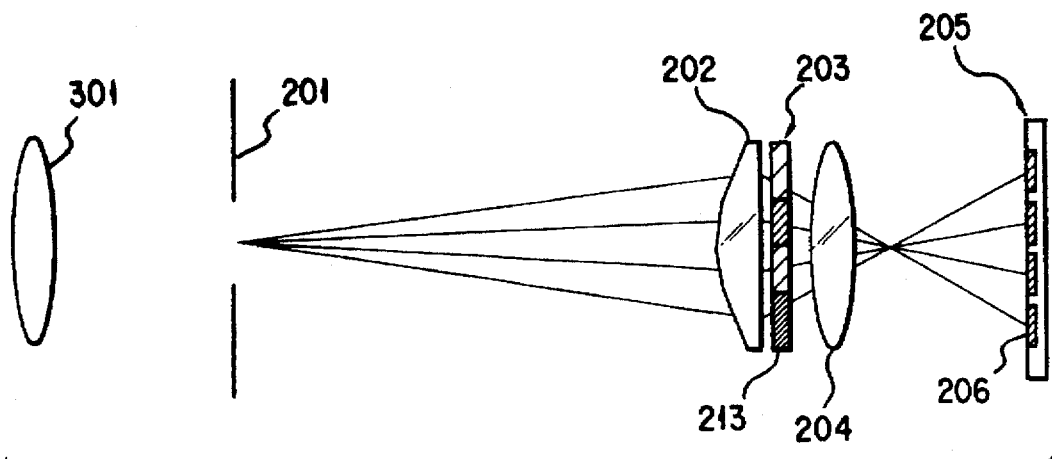
F I G. 3
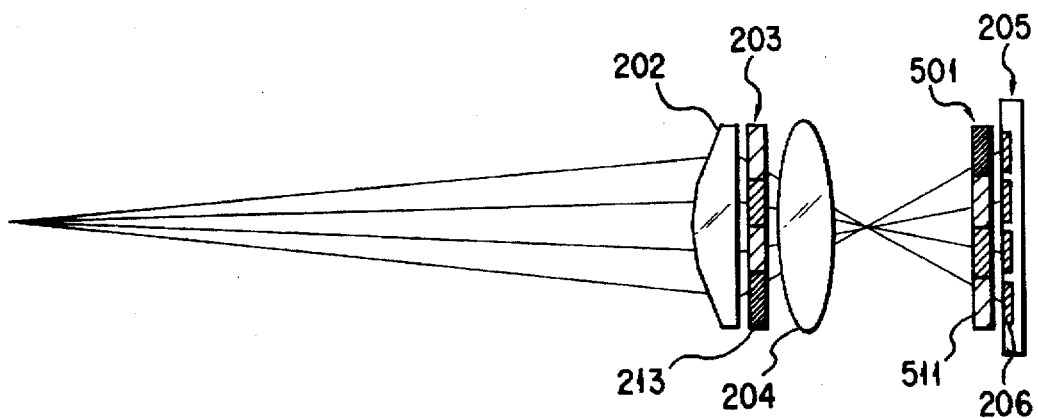
F I G. 5
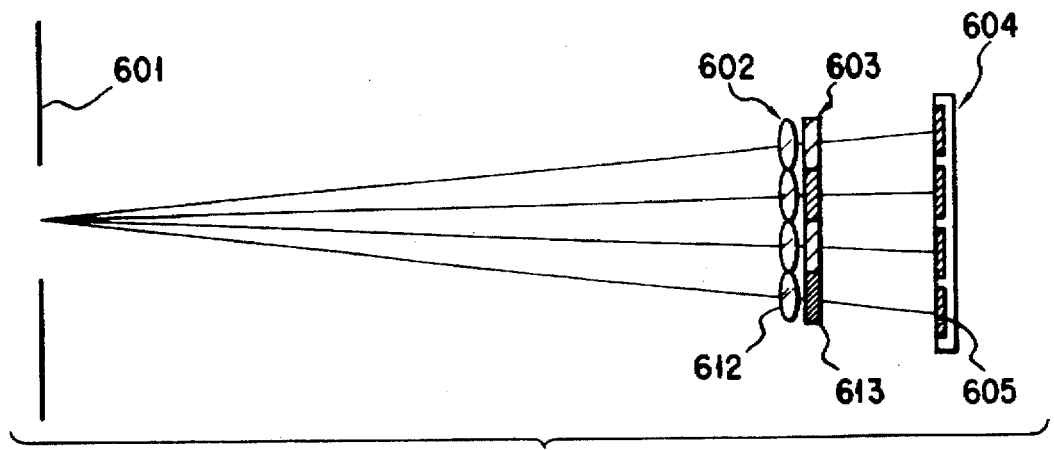
F I G. 6

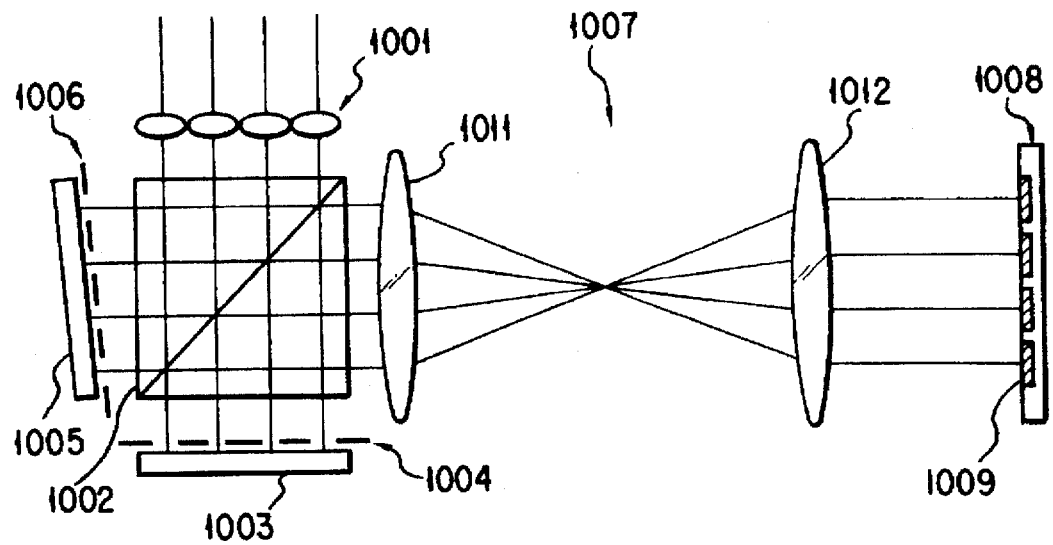
F I G. 10
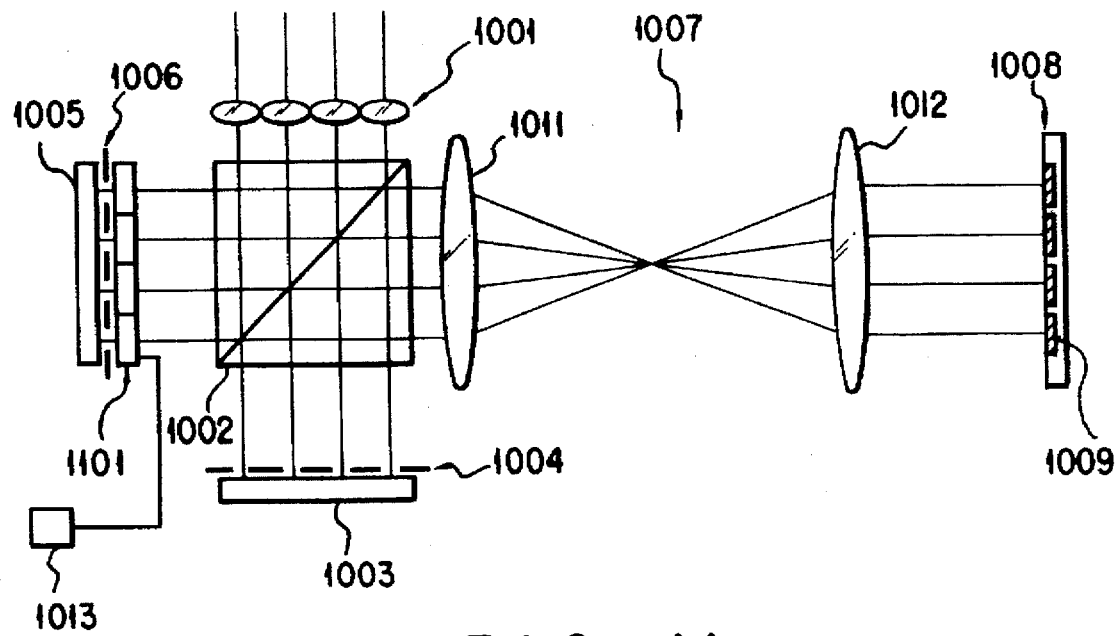
F I G. 11

SPECTROSCOPIC APPARATUS AND SPECTROSCOPIC IMAGE RECORDING APPARATUS

BACKGROUND OF THE INVENTION

1. Field of the Invention

The present invention relates to a spectroscopic apparatus for simultaneously producing a plurality of the same spectroscopic images, and to a spectroscopic image recording apparatus for recording the produced spectroscopic images.

2. Description of the Related Art

There are known a spectroscopic apparatus and a spectroscopic image recording apparatus (hereinafter referred to as "Prior Art 1") as disclosed in, e.g. Jap. Pat. Appln. KOKAI Publication No. 5-248955 (U.S. Pat. No. 5,149,959, U.S. Pat. No. 5,371,358, U.S. Pat. No. 5,276,321).

The invention of Prior Art 1 adopts a method of imaging an object on the basis of a specific wavelength component selected by spectroscopic means such as a wavelength selection filter, a diffraction grating, etc. According to the invention of Prior Art 1 adopting this method, imaging processes associated with various wavelength components are performed, for example, by changing a filter or by controlling the angle of incidence of light on a diffraction grating.

On the other hand, in a spectroscopic apparatus and a spectroscopic image recording apparatus (hereinafter referred to as "Prior Art 2") as disclosed in, e.g. Jap. Pat. Appln. KOKAI Publication No. 61-3574 or "Canadian Journal of Remote Sensing," vol. 18, pp. 233–242 (S. K. Babey and R. J. Soffer; 1992), the wavelength component of light received by a light receiving element array is varied in one direction. According to the invention of Prior Art 2, while an object or an imaging apparatus body is being moved such that the image of the object moves in one direction, an imaging operation is repeated at each time point during movement.

In each of the inventions of Prior Art 1 and Prior Art 2, however, a plurality of spectroscopic images cannot be photographed simultaneously. Thus, when all necessary spectroscopic image data is to be acquired, an imaging operation must be performed a plural number of times. As a result, a great deal of time is needed for imaging, and an imaging efficiency is degraded.

In particular, in the invention of Prior Art 1, two or more wavelength selection filters need to be exchanged or the angle of the diffraction grating needs to be controlled with high precision. In the invention of Prior Art 2, the imaging operation needs to be performed while moving the object or the imaging apparatus body.

In both the inventions of Prior Art 1 and Prior Art 2, the spectroscopic image needs to be recorded while performing some kind of driving control. Thus, an object, the position, shape, etc. of which vary with the passing of time, cannot be recorded.

SUMMARY OF THE INVENTION

The present invention has been made in consideration of the above problems, and the object thereof is to provide a spectroscopic apparatus capable of simultaneously producing spectroscopic images corresponding to a plurality of wavelengths and a spectroscopic image recording apparatus capable of recording the produced spectroscopic images.

In order to achieve the above object, the present invention comprises:

image producing means for producing a plurality of the same images from a single input image by dividing a pupil of an optical system; and spectroscopic means for producing a plurality of spectroscopic images corresponding to the plurality of the same images by extracting a predetermined wavelength component corresponding to each of the plurality of the same images.

According to this structure, images corresponding to a plurality of wavelengths can be simultaneously produced spectroscopically from one input image.

According to the present invention, there are provided a high-speed-processing spectroscopic apparatus and spectroscopic image recording apparatus, since images corresponding to a plurality of wavelengths can be simultaneously produced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 3 schematically shows the structure of the optical system characterizing the spectroscopic image recording apparatus according to the first embodiment of the invention in which an objective lens is provided;

FIG. 5 schematically shows the structure of a spectroscopic image recording apparatus according to a second embodiment of the invention;

FIG. 6 schematically shows the structure of a spectroscopic image recording apparatus according to a third embodiment of the invention;

FIG. 10 schematically shows the structure of a spectroscopic image recording apparatus according to a sixth embodiment of the invention; and FIG. 11 schematically shows the structure of a spectroscopic image recording apparatus according to a seventh embodiment of the invention.

DETAILED DESCRIPTION OF THE PREFERRED EMBODIMENTS

Spectroscopic apparatuses and spectroscopic image recording apparatuses according to preferred embodiments of the present invention will now be described with reference to the accompanying drawings.

Figure 1A:
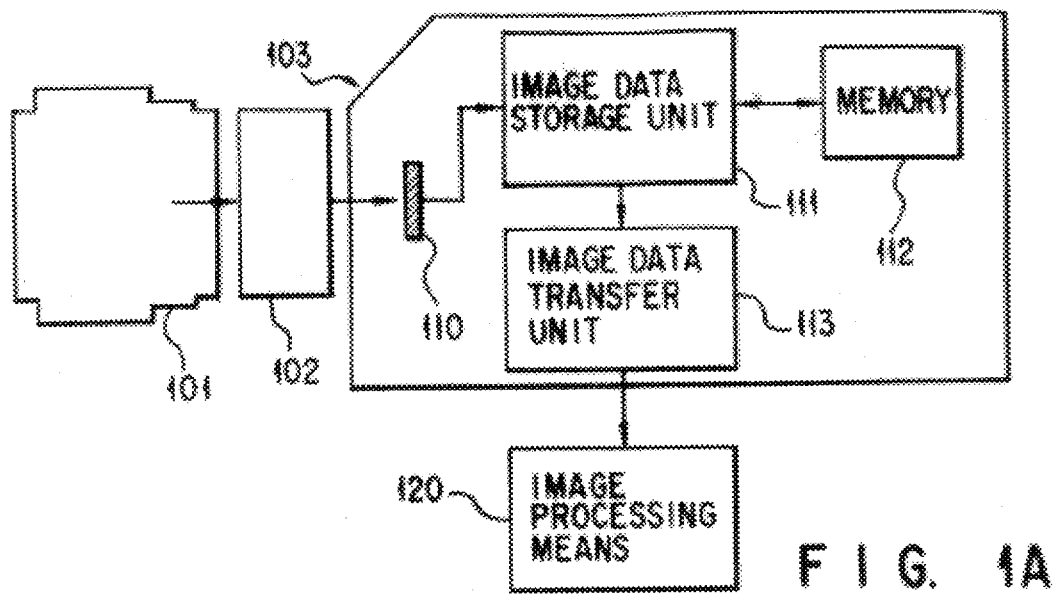
FIG. 1A schematically shows the structure of a spectroscopic image recording apparatus according to a first embodiment of the present invention.

FIG. 1A schematically shows the structure of a spectroscopic image recording apparatus according to a first embodiment of the present invention.

As is shown in FIG. 1A, the spectroscopic image recording apparatus of this embodiment comprises image producing means 101 for producing a plurality of the same images on the basis of an input image, spectroscopic means 102 for extracting a specific wavelength component from the same plural images produced by the image producing means 101, and imaging means 103 for recording the same plural images spectroscopically obtained by the spectroscopic means 102.

With the above structure, an image of an object input to the image producing means 101 is divided into a plurality of the same images and then transmitted to the spectroscopic means 102. The spectroscopic means 102 extracts specific wavelength components from the wavelength components of the respective images constituting the same plural images and produces a plurality of the same spectroscopic images 104 FIG. 1B). The same plural spectroscopic images 104 produced by the spectroscopic means 102 are delivered to the imaging means 103.

Figure 1B:
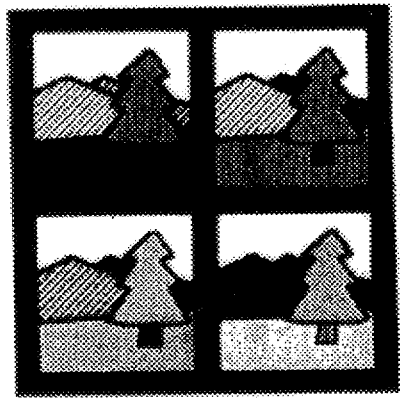
FIG. 1B shows a plurality of the same spectroscopic images, i.e. the same four spectroscopic images arranged in a matrix of 2×2 having mutually different wavelength components which are expressed by the gradations of images of mountains, grounds, trees, etc.

The same plural spectroscopic images 104, as shown in FIG. 1B, produced by the spectroscopic means 102 are divided into, for example, the same four images arranged in a matrix of 2×2.

The same plural spectroscopic images 104 delivered to the imaging means 103 are received by an imaging element 110 and then temporarily stored in an image data storage unit 111. In addition, the spectroscopic images 104 are stored in a memory 112 on an as-needed basis.

A plurality of spectroscopic image data units corresponding to the same plural spectroscopic images 104 received by the imaging element 110 or a plurality of spectroscopic image data units corresponding to the same plural spectroscopic images 104 read out from the memory 112 and temporarily stored in the image data storage unit 111 are transferred to image processing means 120 via an image data transfer unit 113.

Figure 1C:
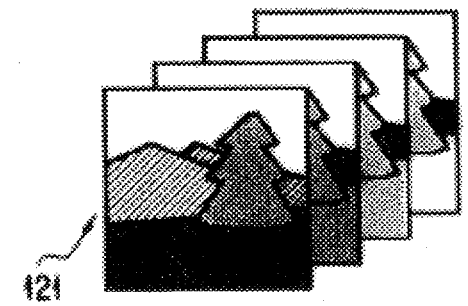
FIG. 1C shows a plurality of spectroscopic image data units having mutually different wavelength components which are expressed, like FIG. 1B, by the gradations of images of mountains, grounds, trees, etc.

The same plural spectroscopic image data units transferred to the image processing means 120 are divided into, e.g. the same four spectroscopic image data units 121 (see FIG. 1C) and the respective same spectroscopic image data units are subjected to an analysis process.

The spectroscopic image recording apparatus according to this embodiment is characterized by the structures of the image producing means 101 and spectroscopic means 102. The characteristic structures will be described in detail in connection with the embodiments described later, but a detailed description of the imaging means 103 and image processing means 120 is omitted.

Figure 2:
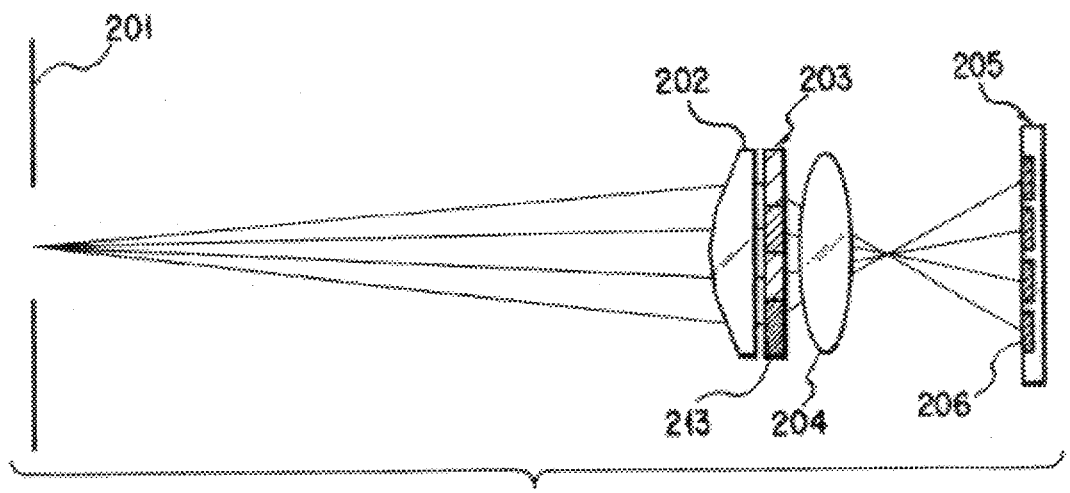
FIG. 2 schematically shows the structure of an optical system characterizing the spectroscopic image recording apparatus according to the first embodiment of the present invention to which a prism is applied as image producing means.

FIG. 2 schematically shows the structure of the optical system characterizing the spectroscopic image recording apparatus according to the first embodiment of the present invention to which a prism 202 is applied as image producing means 101 (see FIG. 1A).

As is shown in FIG. 2, the image producing means 101 (see FIG. 1A) applied to the spectroscopic image recording apparatus of this embodiment comprises a field stop 201, a prism 202 having a plurality of light refraction surfaces (having normal directions different from the optical axial direction of the optical system), and a lens 204.

The prism 202 is so situated near a pupil plane of the lens 204 that the pupil plane of the lens 204 is divided into four portions by the light refraction surfaces of the prism 202. As a result, a plurality of the same images are produced on the imaging element 205 situated in a focal plane of the lens 204.

In FIG. 2, four light refraction surfaces are formed on the prism 202 and the respective four same images are formed on the imaging element 205 as a plurality of the same spectroscopic images 206 formed of mutually different wavelength components.

A light transmission portion or an opening portion is formed in an almost central portion of the field stop 201. It is desirable that the shape and dimensions of the light transmission portion or opening portion be so determined that the same plural images produced on the imaging element 205 do not overlap each other.

If the field stop 201 is not provided, all of the same images produced on the imaging element 205 overlap each other with optical positional displacement due to the prism 202. As a result, the quality of each of the same plural images is degraded.

It is desirable that the field stop 201 be situated near the object or in an optically conjugate position with the object so that the contour of each of the same plural images may become clear.

As is shown in FIG. 2, the spectroscopic means 102 (see FIG. 1A) applied to the spectroscopic image recording apparatus of the present embodiment is constituted by a wavelength selection filter array 203 comprising two or more types of wavelength selection filters 213 which selectively pass specific wavelength components.

The wavelength selection filters 213 are, for example, optical filters for selecting specific wavelength components such as interference filters, multi-layer filters, color filters, etc.

The wavelength selection filter array 203 comprises the above-mentioned two or more types of wavelength selection filters 213 arranged two-dimensionally so as to be aligned to the positions of the beams divided by the prism 202.

The filters 213 of the wavelength selection filter array 203 are situated at positions where the light beams are divided to correspond to the same plural images, respectively (e.g. near the prism 202 and the object-side of the imaging element, or in an optically conjugate position with the prism 202 and imaging element 205).

According to the above structure, the same plural images are formed on the imaging element 205 as the same plural spectroscopic images 206 having mutually different wavelength components.

However, in the case where the object is situated close to the spectroscopic image recording apparatus in the structure shown in FIG. 2, the points of view of the same plural images differ from each other due to parallax and the spatial structure of each of the same plural images will be distorted.

In order to overcome the above drawback, it is possible, for example, to provide an objective lens 301 such that the focal plane of the lens 301 coincides with the plane of the field stop 201, as shown in FIG. 3.

According to this structure, the field stop 201 and imaging element 205 are situated in the optical conjugate position by the lens 204. Thus, both the image of the object and the image of the field stop 201 can be focused on the imaging element 205, and the influence of the parallax can be reduced.

As has been described above, according to this embodiment, there is provided a spectroscopic image recording apparatus capable of simultaneously recording the same plural spectroscopic images 206 and recording images of an object with the position, shape, etc. which vary with the passing of time.

Figure 4:
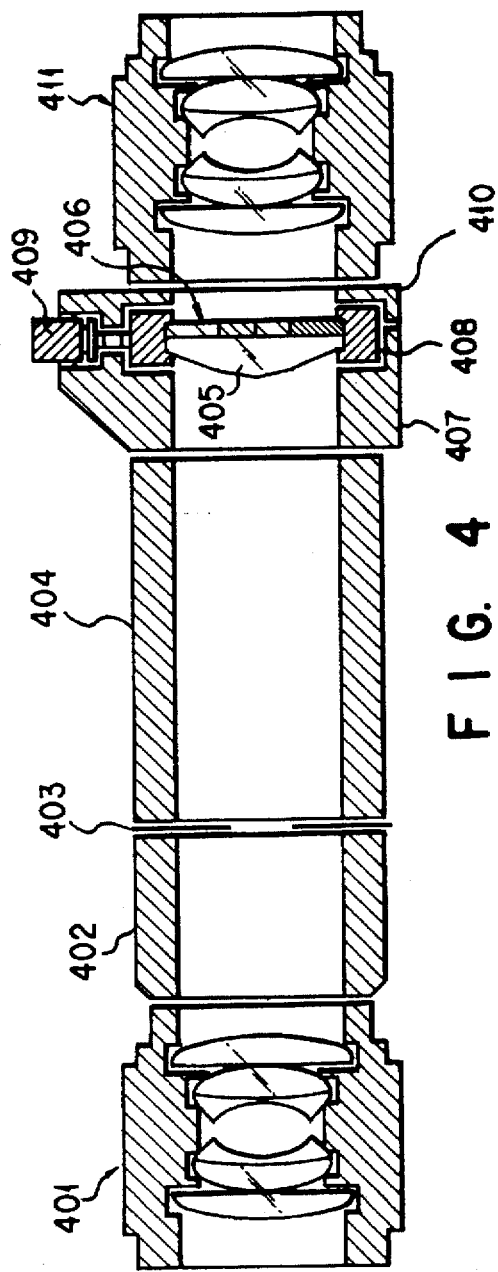
FIG. 4 schematically shows the structure of the optical system characterizing the spectroscopic image recording apparatus according to the first embodiment of the invention to which photographing lenses for a camera are applied as image producing means and spectroscopic means.

FIG. 4 schematically shows the structure of the optical system characterizing the spectroscopic image recording apparatus according to the first embodiment of the invention to which first and second photographing lenses 401 and 411 for a camera (hereinafter referred to as "first and second camera lenses 401 and 411") are applied as image producing means 101 and spectroscopic means 102 (see FIG. 1A).

In the optical system shown in FIG. 4, a rectangular opening portion is formed in a central portion of a field stop 403 situated in a focal plane (film plane) of the first camera lens 401. The field stop 403 is interposed between the other end portion of a first extension member 402 having a one end portion connected to the first camera lens 401 and one end portion of a second extension member 404.

The other end portion of the second extension member 404 is connected to a first annular member 407 for mounting a prism 405. The first annular member 407 is fixed to a second annular member 410 by means of a screw (not shown).

The second annular member 410 is fixed to the second camera lens 411.

An annular rotational member 408 is rotatably interposed between the first and second annular members 407 and 410, with a lubricant filled therebetween. The rotational member 408 is rotatable over several degrees with respect to the optical axis.

In the optical system shown in FIG. 4, a lever 409 is attached to the rotational member 408. Thus, the rotational member 408 can be rotated in a predetermined direction from the outside of the first and second annular members 407 and 410. In addition, when the screw (not shown) is fastened to connect the lever 409 and rotational member 408, the rotational member 408 can be fixed to the first and second annular members 407 and 410.

In the optical system, the rotational member 408 is provided with the prism 405 (having the same structure, operation and advantage as the prism 202 shown in FIG. 2) having a plurality of light refraction surfaces (with normal directions different from the optical axial direction of the optical system) and a wavelength selection filter array 406 comprising two or more types of wavelength selection filters (having the same structure, operation and advantage as the wavelength selection filters 213) which selectively pass specific wavelength components.

By rotating the rotational member 408 in a predetermined direction, the relative positions of the prism 405 and wavelength selection filter array 406 can be finely adjusted. Thus, the positional relationship between spectroscopic images and a pixel array of the imaging element (not shown) provided in the focal plane (film plane) of the second camera lens 411 can be adjusted.

It is desirable that in the optical system shown in FIG. 4 the second annular member 410 and second camera lens 411 be so positioned that the prism 405 may be situated near the pupil plane of the second camera lens 411. In the state of normal use, the second camera lens 411 is adjusted and held so that the image of the field stop 403 is focused on the imaging element (not shown) situated in the focal plane (film plane) (i.e. so that a plurality of field stop images are formed on the imaging element by the optical function of the prism 405).

In the above structure, the image of the object received by the first camera lens 401 is focused on the field stop 403 situated in the focal plane (film plane) of the first camera lens 401 and then formed on the imaging element as a plurality of the same spectroscopic images having mutually different wavelength components. As a result, there is provided a spectroscopic image recording apparatus capable of simultaneously recording the same plural spectroscopic images and recording images of an object with the position, shape, etc. which vary with the passing of time.

A spectroscopic image recording apparatus according to a second embodiment of the invention will now be described with reference to FIG. 5. In this embodiment, the structural elements common to those in the first embodiment are denoted by like reference numerals and a description thereof is omitted.

Like the first embodiment, the spectroscopic image recording apparatus of the second embodiment is constructed such that the prism 202 is situated near the pupil plane of the lens 204 to divide the pupil plane and the wavelength selection filter array 203 is aligned with the divided beams to perform a spectroscopic operation.

In the second embodiment, in addition to the structure of the first embodiment, another wavelength selection filter array 501 comprising wavelength selection filters 511 having spectroscopic characteristics similar to those of the wavelength selection filters 213 is provided near the imaging element 205. Thereby, the spectroscopic operation is performed once again.

The light beams spectroscopically obtained by the wavelength selection filters 213 constituting the wavelength selection filter array 203 are focused on the imaging element 205 with positional displacement due to the optical function of the prism 202. However, by positioning the wavelength selection filters 511 at the respective focal positions, the separation characteristics of the wavelength components can be enhanced.

According to this structure, the same plural spectroscopic images 206 can be formed on the imaging element 205 with high precision by properly selecting the spectroscopic characteristics of the wavelength selection filters 213 and 511 of the two wavelength selection filter arrays 203 and 501. For example, the spectroscopic transmissivity of each wavelength selection filter 511 can be set so as to exclusively select one of the light beams with various wavelengths which have passed through the wavelength selection filter array 203. Thereby, the degree of overlap of the same plural spectroscopic images 206 can be reduced.

As a result, the field stop 201 (see FIGS. 1A and 2) used in the first embodiment can be dispensed with. Accordingly, there is no need to provide a relay optical system, etc. for mounting the field stop. Therefore, the structure of the optical system can be simplified, and the spectroscopic image recording apparatus can be reduced in size and weight. Since the advantages of the second embodiment are the same as those of the first embodiment, a description thereof may be omitted.

A spectroscopic image recording apparatus according to a third embodiment of the invention will now be described with reference to FIG. 6.

As is shown in FIG. 6, the spectroscopic image recording apparatus of this embodiment has a structure similar to that of the first embodiment shown in FIG. 2. However, the prism 202 and lens 204 used as image producing means 101 (see FIG. 1A) in the first embodiment are replaced with a lens array 602 comprising a plurality of lenses 612 situated near a wavelength selection filter array 603. In the third embodiment, an imaging element 604 is situated in a focal plane of each of the lenses 612.

The wavelength selection filter array 603 comprises two or more types of wavelength selection filters 613 (having the same structure, operation and advantage as those of the wavelength selection filters 213 in FIG. 2). The filters 613 are respectively positioned on the optical path connecting the lenses 612 of the lens array 602 and the focal points of the lenses 612.

According to this structure, the same plural images are formed by the lens array 602 and wavelength selection filter array 603 on the imaging element 604 as the same plural spectroscopic images 605 having mutually different wavelength components. As a result, there is provided a spectroscopic image recording apparatus capable of simultaneously recording the same plural spectroscopic images and recording images of an object with the position, shape, etc. which vary with the passing of time.

In the present embodiment, too, the overlap of spectroscopic images 605 on the imaging element 604 needs to be avoided by situating a field stop 601, as shown in FIG. 6. In connection with this, it is desirable that the influence of parallax be reduced by situating an object lens (not shown) on the object side of the field stop 601, like the first embodiment. In addition, it is desirable that the degree of overlap among the spectroscopic images 605 be reduced by adding other wavelength selection filters on the object side of the imaging element 604, like the second embodiment, instead of providing the field stop 601.

A spectroscopic image recording apparatus according to a fourth embodiment of the invention will now be described with reference to FIG. 7.

Figure 7:
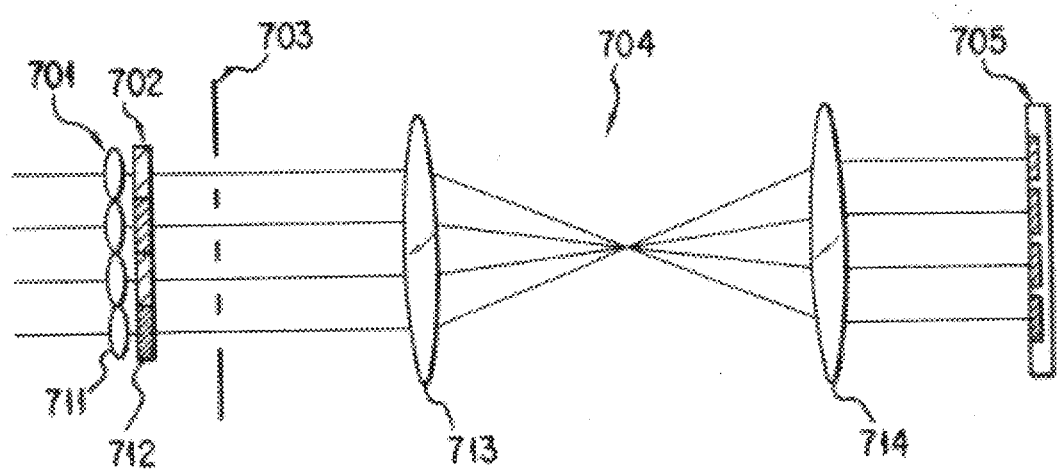
FIG. 7 schematically shows the structure of a spectroscopic image recording apparatus according to a fourth embodiment of the invention.

As is shown in FIG. 7, the image producing means 101 (see FIG. 1A) applied to the spectroscopic recording apparatus of this embodiment is composed of a lens array 701 comprising four lenses 711, a field stop array 703, and a relay optical system 704 comprising a pair of lenses 713 and 714.

The lens array 701 comprises the lenses 711 having substantially equal focal distances. The lenses 711 are arranged two-dimensionally.

The field stop array 703 comprises a plurality of light transmission portions or opening portions (e.g. rectangular openings). These light transmission openings or openings are formed at the same pitch of arrangement as the lenses 711 of the lens array 701.

The field stop array 703 is situated at the focal plane of the lens array 701. An image of the object or an image of the opening of the field stop formed at this focal position is transmitted onto an imaging element 705 via the relay optical system 704.

According to the above structure, overlapping of the same individual plural images can be prevented and the image-formation magnification can be properly varied by the combination of the constituent lenses, etc. (in FIG. 7, the combination of a pair of lenses 713 and 714).

The spectroscopic means 102 (see FIG. 1A) applied to the spectroscopic image recording apparatus of the present embodiment is constituted by a wavelength selection filter array 702 comprising two or more types of wavelength selection filters 712 (having the same structure, operation and advantage as those of the wavelength selection filters 213 in FIG. 2) for selectively passing specific wavelength components.

The wavelength selection filters 712 are, for example, optical filters for selecting specific wavelength components such as interference filters, multi-layer filters, color filters, etc.

The wavelength selection filter array 702 comprises the above-mentioned two or more types of wavelength selection filters 712 arranged two-dimensionally so as to be aligned to the positions of the openings of the field stop array 703.

The wavelength selection filter array 702 is situated near the respective lenses 711 or near the object-side of the imaging element 705.

The wavelength selection filter array 702 may be situated near the opening portions of the field stop array 703. In this case, the plane of the field stop array 703 and the plane of the imaging element 705 are situated in an optically conjugate positional relationship with each other. Thus, consideration should be paid to prevent an image of dust, etc. adhering to the surfaces of the wavelength selection filters 712 from being focused on the imaging element 705.

According to this structure, the same plural images are formed on the imaging element 705 as a plurality of the same spectroscopic images having mutually different wavelength components. As a result, there is provided a spectroscopic image recording apparatus capable of simultaneously recording the same plural spectroscopic images and recording images of an object with the position, shape, etc. which vary with the passing of time.

Figure 8:
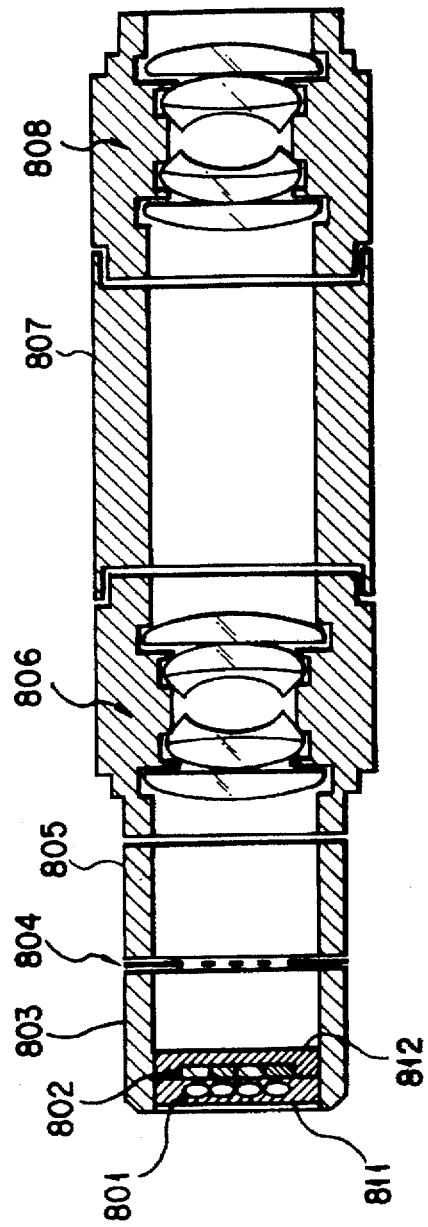
FIG. 8 schematically shows the structure of an optical system characterizing the spectroscopic image recording apparatus according to the fourth embodiment of the invention to which photographing lenses for a camera are applied as image producing means and spectroscopic means.

FIG. 8 schematically shows the structure of an optical system characterizing the spectroscopic image recording apparatus according to the fourth embodiment of the invention to which first and second photographing lenses 806 and 808 for a camera (hereinafter referred to as "first and second camera lenses 806 and 808")are applied as image producing means 101 and spectroscopic means 102 (see FIG. 1A).

In the optical system shown in FIG. 8, a lens array 801 comprising a plurality of lenses is fixed to one end portion of a support member 803 by means of a lens array support member 811.

A wavelength selection filter array 802 comprising a plurality of wavelength selection filters (having the same structure, operation and advantage as those of the wavelength selection filters 213 in FIG. 2) aligned to the lens arrangement of the lens array 801 is fixed to the support member 803 by means of a filter support member 812 in the vicinity of the lens array 801.

A plurality of rectangular opening portions aligned to the lens arrangement of the lens array 801 are formed in a central portion of a field stop array 804 situated at a focal plane of the lens array 801. The field stop array 804 is interposed between the other end portion of the support member 803 and one end portion of an extension member 805.

The other end portion of the extension member 805 is provided with the first camera lens 806. The first camera lens 806 is connected to the second camera lens 808 with an extension member 807 interposed. The first camera lens 806, extension member 807 and second camera lens 808 constitute a relay lens system.

As is shown in FIG. 8, when the same type of the first and second camera lenses 806 and 808 are arranged to be opposed to each other, a relay optical system capable of canceling optical characteristics such as aberration can be obtained. In normal use, the second camera lens 808 is adjusted and held such that a plurality of images of the field stop array 802 and an image of the object are formed on an imaging element (not shown) situated in the focal plane (film plane) of the second camera lens 808.

In the above structure, the image of the object, which is to be received by the first camera lens 806, is focused on the surface of the field stop array 804 situated at the focal plane (film plane) of the lens array 801 and then formed on the imaging element as a plurality of the same spectroscopic images having mutually different wavelength components. As a result, there is provided a spectroscopic image recording apparatus capable of simultaneously recording the same plural spectroscopic images and recording images of an object with the position, shape, etc. which vary with the passing of time.

A spectroscopic image recording apparatus according to a fifth embodiment of the present invention will now be described with reference to FIG. 9.

Figure 9:
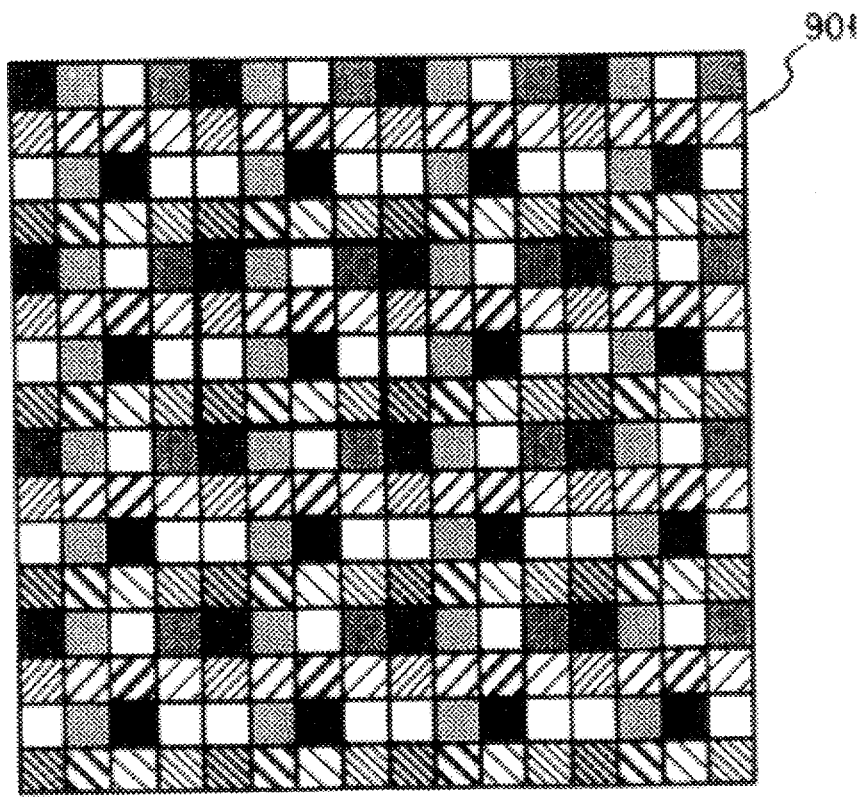
FIG. 9 schematically shows the structure of a wavelength selection filter array applied to a spectroscopic image recording apparatus according to a fifth embodiment of the invention, the wavelength selection filter array comprising as a basic unit 16 types of wavelength selection filters regularly arranged two-dimensionally in an area defined by thick lines in FIG. 9, the wavelength selection functions of the 16 types of wavelength selection filters being distinguished from one another by gradations or directions and thickness of hatching lines.

FIG. 9 schematically shows the structure of a wavelength selection filter array 901 applied to the spectroscopic image recording apparatus of this embodiment. The wavelength selection filter array 901 serves as both image producing means 101 and spectroscopic means 102 (see FIG. 1A).

The wavelength selection filter array 901 applied to this embodiment comprises two-dimensionally arranged basic units each consisting of 16 types of wavelength selection filters regularly arranged two-dimensionally in an area defined by thick lines in FIG. 9.

The wavelength selection filter array 901 is disposed near the object-side of an imaging element (not shown) such that each wavelength selection filter covers the light receiving area of each pixel of the imaging element.

The object image data received by the imaging element in which the wavelength selection filter array 901 is mounted is transferred from the imaging means 103 (see FIG. 1A) to the image processing means 120 (see FIG. 1A). The image processing means 120 thins out the same plural image data units having different wavelength components and reconstructs a single image on the basis of the same kind of wavelength components.

When the wavelength selection filter array 901, as shown in FIG. 9, is used, the vertical and horizontal spatial resolutions of this wavelength selection filter array 901 are reduced to ¼, respectively, as compared to the spatial resolutions of the imaging element itself. As a result, a plurality of the same spectroscopic images having 16 kinds of wavelength components are simultaneously formed on the imaging element.

According to the above structure, the same plural images can be produced without using optical members such as a prism, a lens array, etc. Therefore, local degradation (in particular, degradation in image quality of peripheral portions of the same plural images) in MTF (modulation transfer function) due to the optical function of the aforementioned optical members can be avoided. Thus, a spectroscopic image recording apparatus capable of taking a spectroscopic image having given spatial frequency characteristics at a constant precision can be realized. The other advantages of this embodiment are the same as those of the first embodiment, and a description thereof is omitted.

A spectroscopic image recording apparatus according to a sixth embodiment of the present invention will now be described with reference to FIG. 10.

As is shown in FIG. 10, the spectroscopic image recording apparatus of this embodiment has a structure similar to that of the fourth embodiment (see FIGS. 7 and 8). The wavelength selection filter array used as spectroscopic means 102 (see FIG. 1A), however, is replaced with a beam splitter 1002, first and second flat mirrors 1003 and 1005 and first and second field stop arrays 1004 and 1006.

The first and second flat mirrors 1003 and 1005 are positioned near focal planes of a lens array 1001, and first and second field stop arrays 1004 and 1006 are mounted on the first and second flat mirrors 1003 and 1005.

As is shown in FIG. 10, an object image or light waves received by the lenses of the lens array 1001 are incident on the beam splitter 1002.

Part of the light waves incident on the beam splitter 1002 is reflected by the beam splitter 1002 and reaches the second flat mirror 1005, and the other part of the light waves passes through the beam splitter 1002 and reaches the first flat mirror 1003.

Reflected light components from the first and second flat mirrors 1003 and 1005 are optically coupled by the beam splitter 1002 and focused on an imaging element 1008 via a relay lens system 1007 comprising a pair of lenses 1011 and 1012.

At this time, a plurality of the same images are produced on the imaging element 1008.

When at least one of the first and second flat mirrors 1003 and 1005 is inclined at a small angle, a difference arises between the optical path length of the light waves which have passed through the lenses of the lens array 1001 and the beam splitter 1002 and the optical path length of the light waves which have passed through the lenses of the lens array 1001 and have been reflected by the beam splitter 1002. In this case, both light waves interfere with each other and only a specific wavelength component is extracted. Thereby, the same advantage is obtained as in the case of disposing the wavelength selection filter in the optical path. Thus, a plurality of the same spectroscopic images 1009 are formed on the imaging element 1008.

According to the spectroscopic means applied to the present embodiment, the relative inclination of the first and second flat mirrors 1003 and 1005 is controlled so that the wavelength components of the plural same spectroscopic images 1009 formed on the imaging element 1008 can be varied. Therefore, the degree of freedom of wavelength selection is increased. The other advantages of this embodiment are the same as those of the first embodiment, and a description thereof is omitted.

A spectroscopic image recording apparatus according to a seventh embodiment of the present invention will now be described with reference to FIG. 11. The structural elements common to those in the sixth embodiment are denoted by like reference numerals and a description thereof is omitted.

As is shown in FIG. 11, the spectroscopic image recording apparatus of this embodiment has a structure similar to that of the fourth or sixth embodiment (see FIGS. 7, 8 and 10). The spectroscopic means 102 (see FIG. 1A), however, comprises a beam splitter 1002, first and second flat mirrors 1003 and 1005, first and second field stop arrays 1004 and 1006, and a liquid crystal element array 1101 disposed between the second field stop array 1006 and the beam splitter 1002.

As is shown in FIG. 11, an object image or light waves received by the lenses of a lens array 1001 are incident on the beam splitter 1002.

Part of the light waves incident on the beam splitter 1002 is reflected by the beam splitter 1002 and reaches the second flat mirror 1005, and the other part of the light waves passes through the beam splitter 1002 and reaches the first flat mirror 1003.

Reflected light components from the first and second flat mirrors 1003 and 1005 are optically coupled by the beam splitter 1002 and focused on an imaging element 1008 via a relay lens system 1007 comprising a pair of lenses 1011 and 1012.

At this time, a plurality of the same images are produced on the imaging element 1008.

In this spectroscopic image recording apparatus of the present embodiment, unlike the sixth embodiment, the refractive index of the liquid crystal element array 1101 is varied instead of controlling the relative inclination of the first and second flat mirrors.

A predetermined voltage is applied from a power supply 1013 to the liquid crystal element array 1101 used in the present embodiment. Thus, the liquid crystal molecules of each liquid crystal element rotate about axes perpendicular to the optical axis.

Accordingly, when a predetermined voltage is applied to the liquid crystal element array 1101, a difference arises between the optical path length of the light waves which have passed through the lenses of the lens array 1001 and the beam splitter 1002 and the optical path length of the light waves which have passed through the lenses of the lens array 1001 and have been reflected by the beam splitter 1002. In this case, both light waves interfere with each other and only a specific wavelength component is extracted. This is the same advantage as in the case where the relative inclination of the first and second flat mirrors 1003 and 1005 is controlled. Thus, a plurality of the same spectroscopic images 1009 are formed on the imaging element 1008.

According to the spectroscopic means applied to the present embodiment, it is possible to avoid a distortion of the spectroscopic image 1009 on the imaging element 1008 or an error in a selected wavelength band which results from the control of the relative inclination of the first and second flat mirrors 1003 and 1005. Therefore, the plural spectroscopic images 1009 can be formed on the imaging element 1008 with high precision. Furthermore, the wavelength component to be selected can be easily changed by controlling the voltage applied to the liquid crystal element array 1101 and the degree of freedom of selection of the wavelength can be increased. The other advantages of this embodiment are the same as those of the first embodiment, and a description thereof is omitted.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:
1. A spectroscopic apparatus comprising;
an image producing unit for producing a plurality of same images from a single input image by dividing a pupil of an optical system;
a first spectroscopic unit for producing a plurality of first spectroscopic images corresponding to said plurality of same images by extracting a predetermined wavelength component corresponding to each of said plurality of same images; and
a second spectroscopic unit for producing a plurality of second spectroscopic images corresponding to respective ones of said first spectroscopic images by extracting a predetermined wavelength component corresponding to each of said first spectroscopic images corresponding to said plurality of same images.

2. A spectroscopic apparatus according to claim 1, further comprising a recording unit for recording said plurality of second spectroscopic images.

3. A spectroscopic apparatus according to claim 1, wherein said image producing unit includes a prism provided with a plurality of light refraction surfaces having normal axes in directions different from a direction of an optical axis of the optical system.

4. A spectroscopic apparatus according to claim 2, wherein said image producing unit includes a prism provided with a plurality of light refraction surfaces having normal axes in directions different from a direction of an optical axis of the optical system.

5. A spectroscopic apparatus according to claim 1, wherein said image producing unit includes a lens array comprising a plurality of lenses having optical axes parallel to an optical axis of the optical system and having focal planes which coincide with one another.

6. A spectroscopic apparatus according to claim 2, wherein said image producing unit includes a lens array comprising a plurality of lenses having optical axes parallel to an optical axis of the optical system and having focal planes which coincide with one another.

7. A spectroscopic apparatus according to claim 1, wherein said first spectroscopic unit includes a wavelength selection filter array comprising a plurality of two-dimensionally arranged filters.

8. A spectroscopic apparatus according to claim 2, wherein said first spectroscopic unit includes a wavelength selection filter array comprising a plurality of two-dimensionally arranged filters.

9. A spectroscopic apparatus according to claim 7, wherein filters of said wavelength selection filter array are respectively provided in optical paths associated with said plurality of same images.

10. A spectroscopic apparatus according to claim 8, wherein filters of said wavelength selection filter array are respectively provided in optical paths associated with said plurality of same images.

11. A spectroscopic apparatus according to claim 1, wherein said second spectroscopic unit includes a wavelength selection filter array comprising a plurality of two-dimensionally arranged filters.

12. A spectroscopic apparatus according to claim 2, wherein said second spectroscopic unit includes a wavelength selection filter array comprising a plurality of two-dimensionally arranged filters.

13. A spectroscopic apparatus according to claim 11, wherein filters of said wavelength selection filter array are respectively provided in optical paths associated with said first spectroscopic images corresponding to said plurality of same images.

14. A spectroscopic apparatus according to claim 12, wherein filters of said wavelength selection filter array are respectively provided in optical paths associated with said first spectroscopic images corresponding to said plurality of same images.

15. A spectroscopic apparatus according to claim 1, wherein said first spectroscopic unit includes a first wavelength selection filter array comprising a first plurality of two-dimensionally arranged filters, said second spectroscopic unit includes a second wavelength selection filter array comprising a second plurality of two-dimensionally arranged filters, and said second wavelength selection filter array exclusively selects a light beam of a given wavelength from a plurality of light beams of various wavelengths which have passed through said first wavelength selection filter array.

16. A spectroscopic apparatus according to claim 2, wherein said first spectroscopic unit includes a first wavelength selection filter array comprising a first plurality of two-dimensionally arranged filters, said second spectroscopic unit includes a second wavelength selection filter array comprising a second plurality of two-dimensionally arranged filters, and said second wavelength selection filter array exclusively selects a light beam of a given wavelength from a plurality of light beams of various wavelengths which have passed through said first wavelength selection filter array.

17. A spectroscopic apparatus according to claim 8, wherein said recording unit includes a solid-state imaging unit for recording said first and second spectroscopic images produced by said first and second spectroscopic units, respectively, and said wavelength selection filter array is arranged proximate to said image producing unit and said recording unit.

18. A spectroscopic apparatus according to claim 12, wherein said recording unit includes a solid-state imaging unit for recording the first and second spectroscopic images produced by said first and second spectroscopic units, respectively, and said wavelength selection filter array is arranged proximate to said image producing unit and said recording unit.

19. A spectroscopic apparatus according to claim 17, further comprising an image processing unit for reconstructing a predetermined image based on pixel signals which are associated with pixels output from said solid-state imaging unit and which include same wavelength components.

20. A spectroscopic apparatus according to claim 18, further comprising an image processing unit for reconstructing a predetermined image based on pixel signals which are associated with pixels output from said solid-state imaging unit and which include same wavelength components.

21. A spectroscopic image recording apparatus comprising:

an image converting unit which includes (i) a prism provided with a plurality of light refraction surfaces having normal axes in directions different from a direction of an optical axis of an optical system, and (ii) a focusing lens for focusing light which has passed through said prism;

a first spectroscopic unit provided between said prism and said focusing lens, said first spectroscopic unit having a first wavelength selection filter used for selectively passing a specific wavelength component therethrough; and second spectroscopic unit provided in an optical path of light transmitted through said focusing lens of said first spectroscopic unit, said second spectroscopic unit having a second wavelength selection filter used for selectively passing a specific wavelength component therethrough;

wherein said prism of said image converting unit is situated proximate to a pupil plane of said focusing lens of said first spectroscopic unit.

22. A spectroscopic apparatus according to claim 21, further comprising a recording unit for recording a light beam which has passed through said second spectroscopic unit.

* * * * *